United States Patent [19]

Pulgiese

[11] Patent Number: 5,021,939
[45] Date of Patent: Jun. 4, 1991

[54] COMPUTERIZED SPRINKLER CONTROL SYSTEM

[75] Inventor: Rocco J. Pulgiese, Lincoln Park, Mich.

[73] Assignee: Demaco Mfg. Group, Ltd., Dearborn, Mich.

[21] Appl. No.: 325,133

[22] Filed: Mar. 16, 1989

[51] Int. Cl.⁵ .................. G05B 11/01; B05B 12/04
[52] U.S. Cl. .................. 364/143; 137/624.2; 137/624.11; 239/67; 239/69
[58] Field of Search .............. 364/143, 144, 140, 145, 364/186, 420; 239/61, 67, 68, 69, 70, 71; 137/624.2, 624.12, 783, 624.11; 47/1 R, 2, DIG. 6

[56] References Cited

U.S. PATENT DOCUMENTS

| Re. 31,023 | 9/1982 | Hall, III | 47/1 R |
|---|---|---|---|
| 4,209,131 | 6/1980 | Barash et al. | 364/144 |
| 4,646,224 | 2/1987 | Ransburg et al. | 364/143 |
| 4,852,802 | 8/1989 | Iggulden et al. | 239/64 |
| 4,875,498 | 10/1989 | Andrews et al. | 137/78.3 |
| 4,892,113 | 1/1990 | Fattahi | 137/78.3 |
| 4,895,303 | 1/1990 | Freyvogel | 239/61 |

Primary Examiner—Jerry Smith
Assistant Examiner—Paul Gordon
Attorney, Agent, or Firm—Brooks & Kushman

[57] ABSTRACT

A computer-controlled irrigation system (10) comprising a computer (22), a number of remote valves (18), and a plurality of reference sensors (28) installed in the area to be irrigated. The number of reference sensors (28) is less than the number of remote valves (18). The computer (22) has a keyboard for providing a set of initialization data (24) supplied by an operator and means for providing a set of operational data (26) for each of the reference sensors (28). Each reference sensor (28) generates a signal indicating actual moisture level for processing by the computer (22), the computer (22) controlling the plurality of remote valves (18) so that the irrigating fluid (12) is delivered to sprinkler heads (20) associated with the remote valves (18) in amounts sufficient to bring the actual moisture level up to a desired moisture level. Delivery of the irrigating fluid (12) is controlled by the computer (22) based on signals indicating actual moisture levels from the reference sensors (28) without operator intervention. A controlled flow of irrigating fluid (12) is managed by the computer (22) to each of the sprinkler heads (20), in amounts dependent on terrain factors set by the operator, and independent of weather conditions.

11 Claims, 14 Drawing Sheets

COMPUTERIZED SPRINKLER CONTROL SYSTEM

TECHNICAL FIELD

The present invention relates to a computer-controlled irrigation system for automatically watering and fertilizing an area to be irrigated. More specifically, the present invention relates to a computer-controlled irrigation system in which control signals are delivered to the computer from a number of reference sensors which is less than a number of sprinkler heads.

BACKGROUND ART

The most primitive form of irrigation control involves a decision by an operator to begin or discontinue application of irrigation water. The effects of under-irrigation are apparent in that soil and plant conditions suffer. However, in many cases excessive irrigation does not cause apparent harm to plants, trees, and shrubs. Where there is an abundance of water, a major harm is waste of irrigation water and energy required for its distribution. Additionally, there may be significant but subtle impairment of plant growth.

Several methods have been developed to improve the efficiency of irrigation while minimizing the burden on human operators. One technique involves the use of pre-programmed timers to automatically start and terminate irrigation. Such timer systems have been refined to provide for multiple timing cycles which vary in accordance with plant growth cycles. However, such systems are limited in that there is no feedback between actual plant water consumption and water application. For example, timer systems are unable to reduce water application during times of humid or rainy weather, and do not account for variable water requirements or terrain topography. Because of water run-off, irrigating a sloping yard, the side of a hill, or a berm is quite difficult and costly. Conversely, less water tends to be required when irrigating depressed or low terrain.

All agricultural experts recommend that to properly irrigate, an operator must plug or use a shovel to dig down to root level to see if watering was too little or too much or if watering was needed.

Because of these limitations, systems which measure actual soil moisture content were devised. Such systems measure soil moisture, including soil electrical conductivity, in a variety of ways. Typical of systems developed which utilize various types of buried sensors to determine when the soil requires irrigation are those found in U.S. Pat. Nos. 2,812,976; 2,611,643; 3,961,753; 4,197,866; and 4,545,396. In general, these systems utilize an inground sensor or probe which will activate the irrigation process dependent upon a certain indicated moisture level and timers.

Efforts to overcome these problems have involved the combining of timers with soil moisture sensors. In such systems, the timers actuate irrigation at predetermined times, but only if the moisture soil sensors indicate that the soil has become dry. Timers eliminate the danger of over-watering while waiting for moisture to penetrate to the sensors. Still, they are not responsive to changes in weather, nor can they sense any characteristics, such as variable terrain topography, other than soil moisture.

Other automatic irrigation systems which have sensed the moisture level in the soil of the area to be irrigated have no way of determining or adequately controlling the quantity of water delivered to the area. Therefore, they cannot provide the capability of conserving limited water resources.

Another problem left unsolved by previous automated approaches is the relatively high cost of having a remote sensor associated with each sprinkler head.

DISCLOSURE OF INVENTION

An object of the present invention is to provide an improved computer-controlled irrigation system having advantages which were not heretofore possible.

In carrying out the above and other objects, the computer-controlled irrigation system of this invention includes a computer having means for providing a computer with a set of initialization data supplied by an operator and means for providing a computer with a set of operational data for each of a plurality of reference sensors which are included in the irrigation system. The reference sensors are installed in the area to be irrigated, the number of reference sensors being less than the number of remote valves. Each reference sensor provides operational data to the computer.

Each reference sensor generates a signal indicating the actual moisture level for processing by the computer. The range of values for the actual moisture level are converted by a scaling routine so that their value lies between 0 (corresponding to very dry conditions) to 100 (which represents swamp-like conditions). Via electronic links, the computer controls the remote valves so that the irrigating fluid is delivered to the sprinkler heads in amounts sufficient to bring the actual moisture level up to a desired moisture level.

In another aspect of the invention, the computer-controlled irrigation system comprehends a method for irrigating. In this method, there are included the steps of storing in the computer the desired moisture level for an area proximate a reference sensor embedded in the area to be irrigated. The actual moisture level is measured by the reference sensor, and a signal based on actual moisture level is sent to the computer. The computer then controls the delivery of irrigating fluid to the area based on desired and actual moisture levels so that the irrigating fluid is delivered in amounts sufficient to bring the actual moisture level up to the desired moisture level.

In a preferred embodiment of the invention, only a single reference sensor is installed in the area to be irrigated, the irrigating fluid being delivered by a number of remote valves and associated sprinkler heads.

In accordance with the invention, a time interval is determined for irrigation, the time interval being required to irrigate so that the actual moisture level rises to the desired moisture level proximate the reference sensor. Irrigation through successive sprinkler heads is then controlled by the computer for a time at each successive sprinkler head equal to the time interval for irrigation proximate the reference sensor. In this way, delivery of irrigating fluid is controlled based on desired and actual moisture levels.

The method of practicing the invention includes storing in the computer a set of initialization data for each of the remote sprinkler heads. Included in the set of initialization data is a terrain factor, a time interval variation factor, a begin time, and an end time for each day of the week. Based on the set of initialization data responding to each remote sprinkler head and on operational data furnished by a reference sensor, irrigation is controlled by the computer. One result is that irrigation occurs for a time equal to the time interval for irrigating proximate the reference sensor to bring the actual up to the desired moisture level thereat. This interval may be adjusted by including an interval variation factor in the set of initialization data for any sprinkler head.

By practicing the invention as summarized above, an operator realizes a number of solutions to problems left unsolved by the prior art. For example, the difficulties associated with varying meteorological and terrain factors are solved, together with the need for hands-off operation. Additionally, the computer-controlled irrigation system relatively is easy to install and inexpensive to operate because there is a lesser number of remote sensors than remote sprinkler heads.

The objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
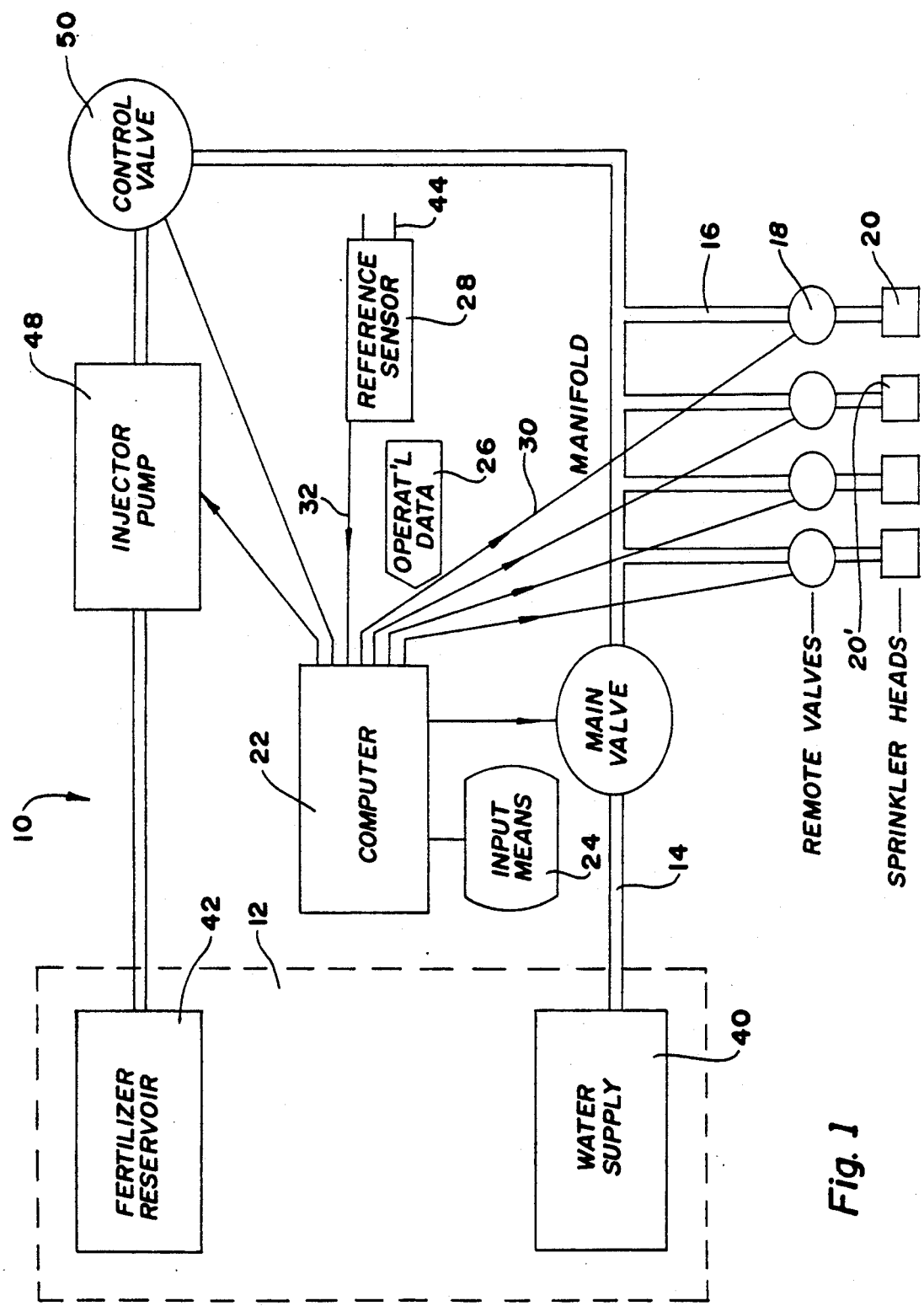
FIG. 1 is a simplified diagram of a computer-controlled irrigation system of the type used with the invention, including an irrigating fluid hydraulic flow diagram.

Turning first to FIG. 1, there is shown a simplified diagram of a computer-controlled irrigation system 10. Included in the system 10 is a reservoir 12 of irrigating fluid, including separate bodies of water 40 and liquid fertilizer 42. Ducting from the reservoir 12 is a main supply line 14 and a plurality of lateral supply lines 16. Each lateral supply line 16 communicates with a remote valve 18 and an associated sprinkler head 20. An important element of the present invention is the one or more reference sensors 28, the number of reference sensors 28 being less than the number of remote sprinkler heads 20. In practicing the present invention, there is no need to incur the expense and inconvenience of installing a reference sensor 28 for each sprinkler head 20 for reasons which later become apparent.

Each reference sensor 28 is embedded in the area to be irrigated and generates a signal [S] which is fed to a computer 22 via a second electrical connection 32 between one of the reference sensors 28 and the computer 22 for processing thereby.

Figure 2A:
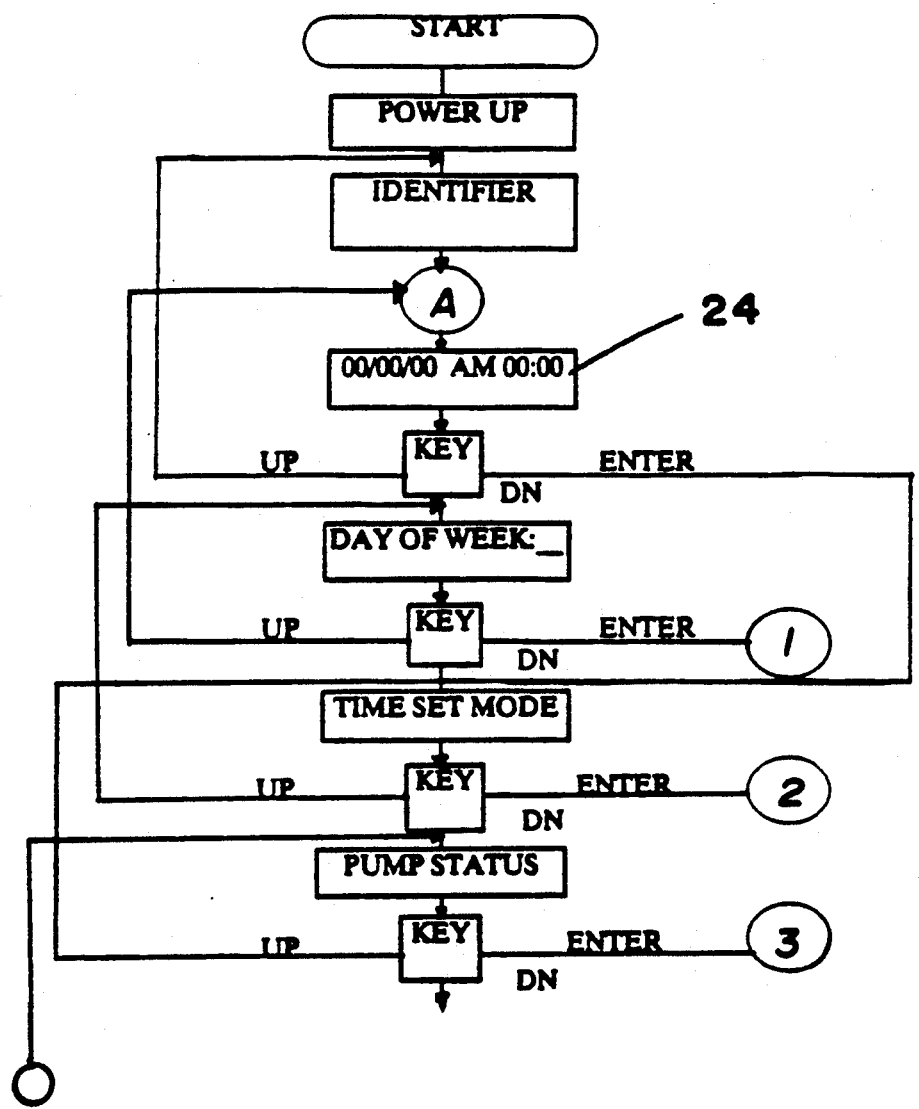
FIG. 2 is a functional flow diagram showing the various initialization operations performed by the computer in operating the system of the invention.
Figure 2B:
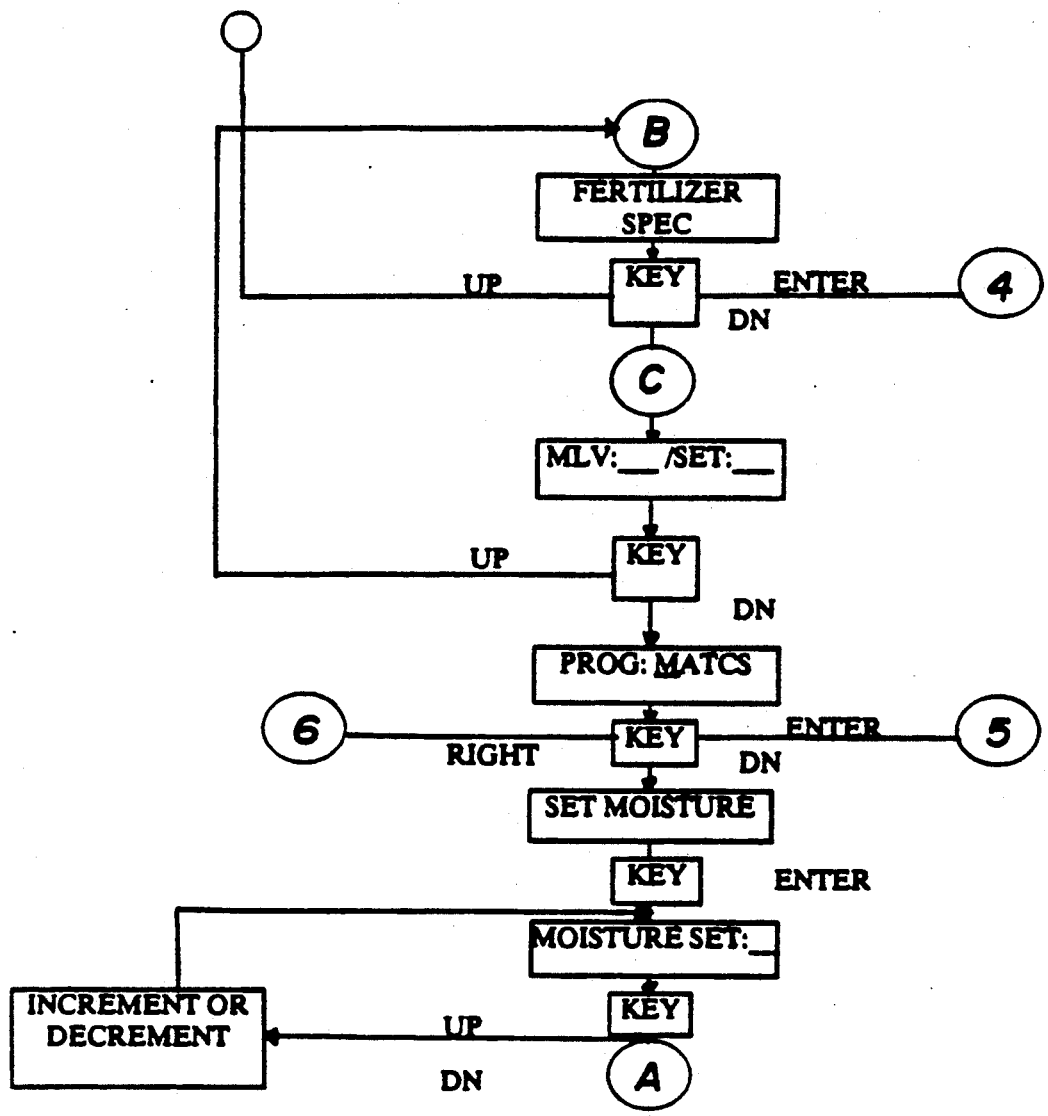

Turning now to FIG. 2, there is depicted a summary flow chart of initialization data, the schematics of which are presented in more detail in FIGS. 3–7. Using means for providing the computer 22 with a set of initialization data 24, an operator provides the computer 22 with a set of initialization data 24. Such means include a keyboard and a display in association with the computer 22. Means for providing the computer 22 with a set of operational data 26 include, for example, the plurality of second electrical connections 32, each second electrical connection 32 linking the computer 22 with one of the reference sensors 28. Each reference sensor 28 generates the control signal [S] for processing by the computer 22, the computer 22 controlling the plurality of remote valves 18 so that the irrigating fluid 40, 42 is delivered to the sprinkler heads 20. Following logic embodied in software installed within the computer 22, a microprocessor controls the plurality of remote valves 18 so that the irrigating fluid 40, 42 is delivered to the sprinkler heads 20 in amounts sufficient to bring the desired moisture level [$M_D$] established by the operator up to the actual moisture level [$M_A$] measured by one of the reference sensors 28.

In the discussion which follows of the best mode for practicing the invention, the following variable names and their respective meanings are used:

| Variable Name | Variable Meaning |
| --- | --- |
| $M_A$ | Actual moisture level |
| $M_D$ | Desired moisture level |
| $T_M$ | Time interval to bring $M_A$ to $M_D$ proximate the reference sensor |
| $N_S$ | Number of reference sensors |
| $N_V$ | Number of remote valves |
| $T_I$ | Irrigation time proximate remote valve$_N$ |
| $T_F$ | Terrain factor |
| $V_F$ | Time interval variation factor |
| $T_B$ | Begin time |
| $T_E$ | End time |
| I | Current (amperes) |
| E | Potential difference (volts) |
| R | Resistance (ohms) |
| S | Control signal |

In the above table, initialization data supplied by a human operator include $M_D$, $T_F$, $V_F$, $T_B$, $T_E$, $N_S$, and $N_V$. Operational data supplied by the reference sensors 28 include $M_A$.

Continuing with primary reference to FIG. 1, the plurality of first electrical connections 30 each link the computer 22 with one of the remote valves 18. There are more remote valves 18 than there are reference sensors 28 [$N_V > N_S$].

With particular reference to how to practice the teachings of the present invention, the present invention also comprehends computer-controlled method for irrigating, wherein the improvement comprises the steps of storing in the computer 22 desired moisture level [$M_D$] data for an area proximate a reference sensor 28 embedded in the area to be irrigated. The actual moisture level [$M_A$] is then measured by the reference sensor 28 and transmitted to the computer 22 for processing thereby. The computer 22 then controls the delivery of irrigating fluid 40, 42 from the reservoir 12 based on the desired moisture level [$M_D$] and actual moisture level [$M_A$] so that the irrigating fluid 40, 42 is delivered in an amount sufficient to bring the desired moisture level [$M_D$] up to the actual moisture level [$M_A$], so that $M_A = M_D$.

In practice, it has been found expedient to store in the computer 22 desired moisture level [$M_D$] data for an area proximate a reference sensor 28. The actual moisture level [$M_A$] is measured by the reference sensor 28 in a manner to be disclosed later. After the initialization data 24 are supplied to the computer 22 by the keyboard and digital display associated with the computer 22, a flow of water 40 is begun so that the water 40 is delivered along the main supply line 14, a lateral supply line 16, a remote valve 18, and an associated sprinkler head 20 proximate one of the plurality of reference sensors 28. A real time clock is an integral part of the computer-controlled system comprehended by the present invention. Using the real time clock, a time interval [$T_M$] is measured, determined by the irrigation period required to bring the desired moisture level [$M_D$] up to the actual moisture level [$M_A$] proximate the area in which a reference sensor 28 is installed.

Next, successive sprinkler heads 20' are supplied with water 40 serially, each for a time equalling $T_M$. In this way, the irrigating fluid 40 is delivered to remote sprinkler heads 20, 20' in controlled amounts regardless of changing weather conditions.

The set of initialization data 24 is stored in the computer 22 for each of the remote sprinkler heads 20. The set of initialization data 24 includes a terrain factor [$T_F$], a time interval variation factor [$V_F$], a begin time [$T_B$], and an end time [$T_E$].

Consider first the utility of the terrain factor [$T_F$]. Under previous approaches, it has been found difficult and expensive to irrigate a hilly area including one or more berms. Problems of run-off have until the automated approach of the present invention remained unsolved. Often, there has been a need for excessive manual intervention in order to harness conventional clock-driven systems to deliver water satisfactorily to hilly areas. To solve this problem, the present invention uses the terrain factor [$T_F$] which the operator may, at his election, specify for each remote sprinkler head 20. For example, if during initialization the operator responds affirmatively to a computer-generated prompt regarding terrain factor [$T_F$], the actual irrigation time proximate the associated remote valve [$T_I$] is halved. An affirmative response to the terrain factor [$T_F$] query instructs the computer 22 to control irrigation so that the water 40 is delivered to a berm proximate the associated remote valve 18 for fifty percent of the normal irrigation time [$T_I$]. Unless other initialization data 24 apply, the time interval [$T_M$] to bring $M_A$ to $M_D$ proximate the reference sensor 28 equals the irrigation time [$T_I$] proximate any remote valve.

At his or her election, the operator can include in the set of initialization data 24 a time interval variation factor [$V_F$] which ranges between 0 and 100%. The time interval variation factor [$V_F$] may be set for any remote valve to determine the irrigation time [$T_I$] as a percent of the time interval [$T_M$] required to bring the actual moisture level [$M_A$] up to the desired moisture level [$M_D$]. For example, if $V_F$ is set equal to 0, no water flows at the associated remote valve 18. If $V_F$ is set at 100%, water flows proximate the remove valve 18 from the associated sprinkler head 20 for 100% of $T_M$. By selectively changing the time interval variation factor [$V_F$], the operator after an initial calibration, without further manual intervention, enables the computer-controlled irrigation system 10 to deliver water 40 in amounts selectively determined to areas of high versus low permeability, and regardless of the contours of associated terrain.

Figure 6A:
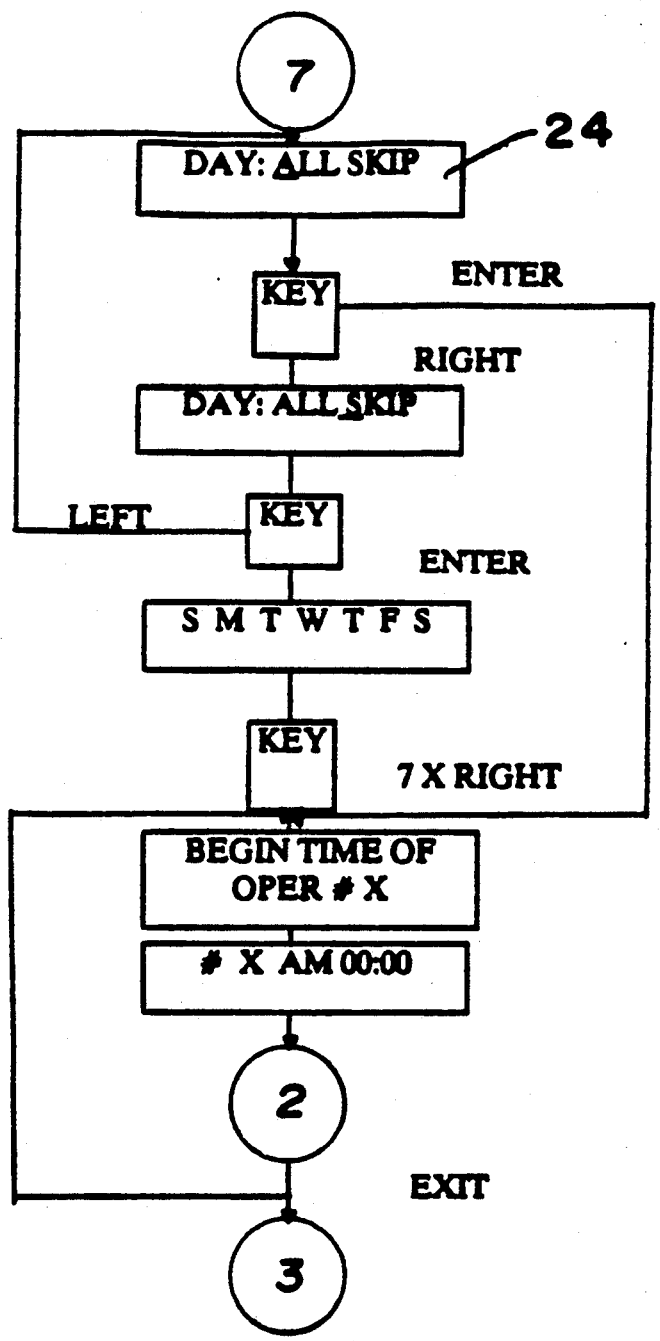
FIG. 6 is a functional flow diagram showing more initialization steps, including scheduling, maintenance and testing in operating the system of the invention.
Figure 6B:
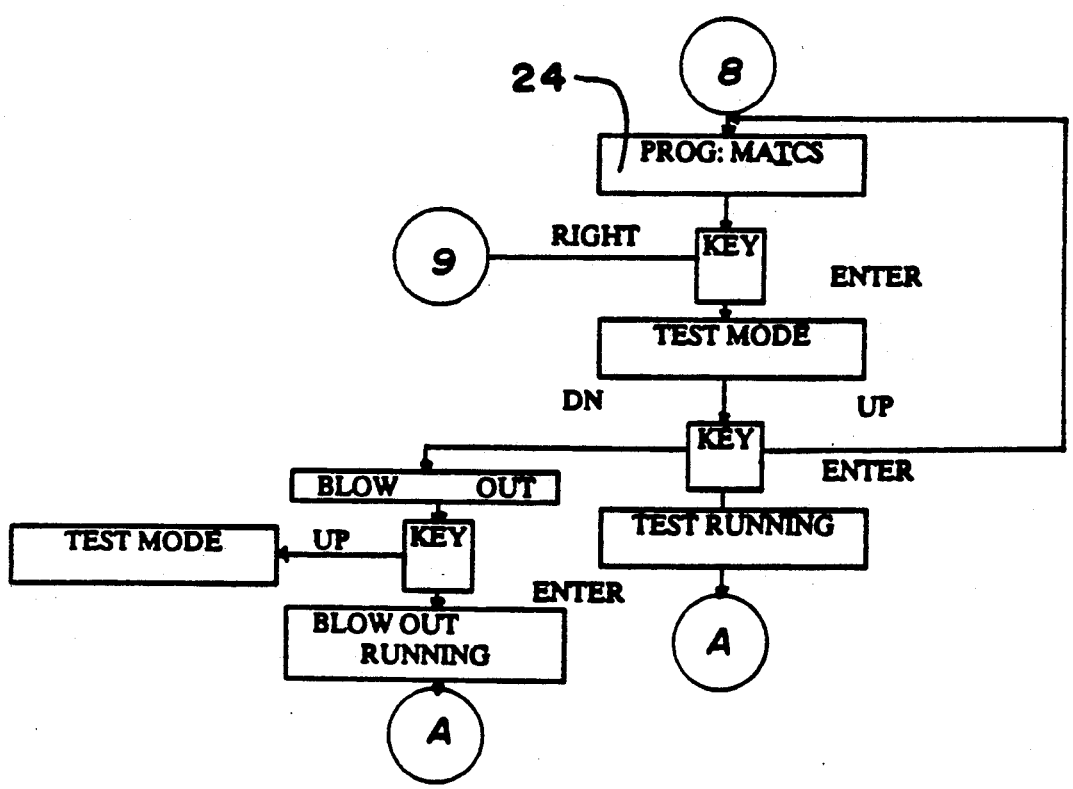
Figure 7A:
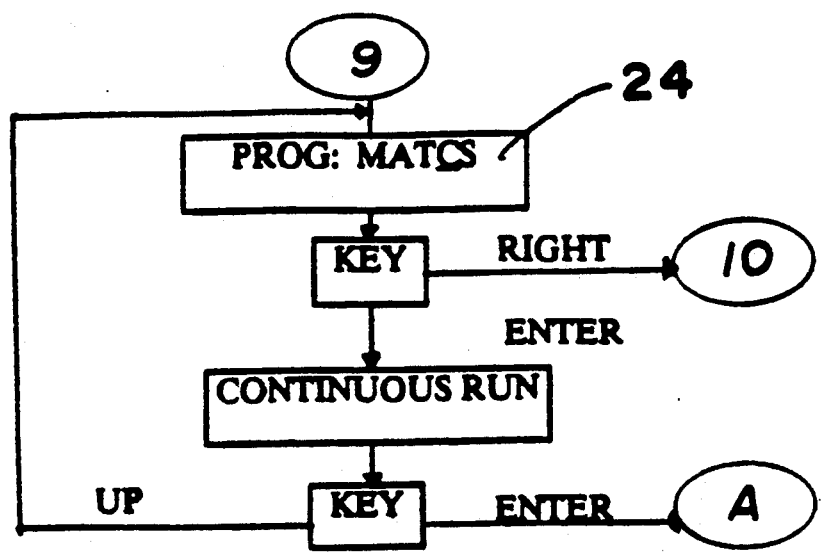
FIG. 7 is a functional flow diagram showing a continuous and single station setting mode in operating the system of the invention.
Figure 7B:
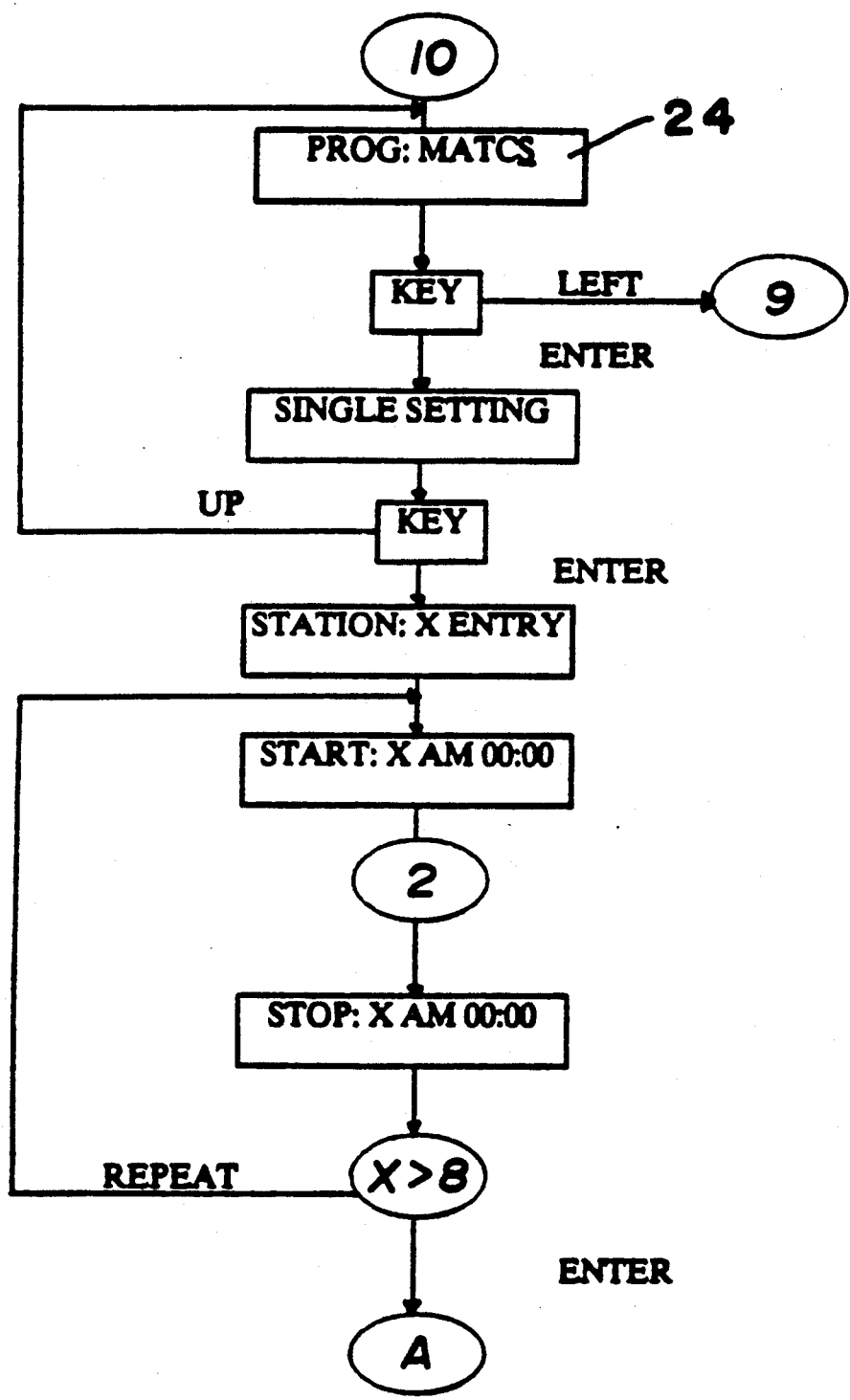

Also included in the set of initialization data 24 is a begin time [$T_B$] for each day of the week, schematically depicted in FIG. 6. By specifying the begin time [$T_B$], the operator can establish a time before which irrigation will not begin. For example, suppose a given remote valve 18 and its associated sprinkler head 20 is located proximate a pathway along which an operator walks to his car at the beginning of the work day. In this situation, regardless of other factors, it is desired that irrigation not commence prior to the anticipated time of that walk to avoid unwanted spraying of a passerby. An end time [$T_E$] can also be established in the set of initialization data 24. After $T_E$ no irrigation will occur at the associated sprinkler head 20, regardless of other factors.

In the preferred embodiment of the computer-controlled irrigation system 10, only a single reference sensor 28 is installed in the area to be irrigated. By using only a single reference sensor 28, the advantages of cost reduction and ease of installation are readily achieved. In practice, a single reference sensor 28 provides the computer 22 with a set of operational data 26 including actual moisture levels [$M_A$] continuously between the begin time [$T_B$] and end time [$T_E$] during a given day. The scheduling of successive irrigation times [$T_I$] over the area to be irrigated is then determined by information furnished to the computer 22 by a single reference sensor 28.

As indicated in FIG. 1, the main supply line 14 delivers irrigating fluid 12 to a plurality of lateral supply lines 16. Associated with each lateral supply line 16 is one remote valve 18 and one sprinkler head 20. As noted earlier, the human operator provides the computer 22 with a set of initialization data 26. It is the reference sensor 28 which provides the set of operational data 26 to the computer 22 for processing. By comparing the sets of initialization data 24 including desired moisture level [$M_D$] and operational data 26 including actual moisture level [$M_A$], the computer 22 controls each remote valves 18 so that irrigating fluid 12 is delivered to the sprinkler heads 20 in amounts sufficient to bring $M_A$ up to $M_D$.

As best illustrated in FIG. 1, a main valve 34 is connected to the water supply 40 and to the main supply line 14. The operator may position the main valve 34 so that it lies either in a first position 36 or a second position 38. When the first position 36 is selected, water 40 is delivered to the areas to be irrigated. Liquid fertilizer 42 is delivered when the second position 38 is selected. Tracing the flow of liquid fertilizer 42 from its source 12, there is first encountered an injector pump 48 which pressurizes the liquid fertilizer 42. This produces a hydraulic flow so that the liquid fertilizer 42 flows from the reservoir 12 through a control valve 50 to a manifold 46 before passage to the lateral supply lines 16. The purpose of the control valve 50 is to prevent the flow of fertilizer 42 into the main water supply 40 by accident. Both the injector pump 48 and control valve 50 are electrically connected to and controlled by the computer 22.

Figure 3A:
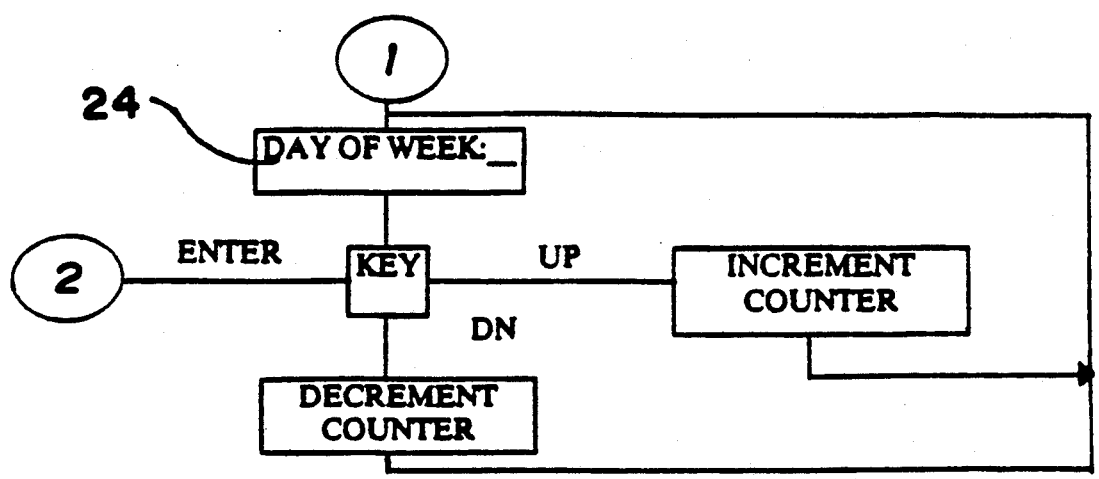
FIG. 3 is a functional flow diagram showing in more detail the initialization operations wherein the day, date, and time are initialized into the computer, together with a pump status.
Figure 3B:
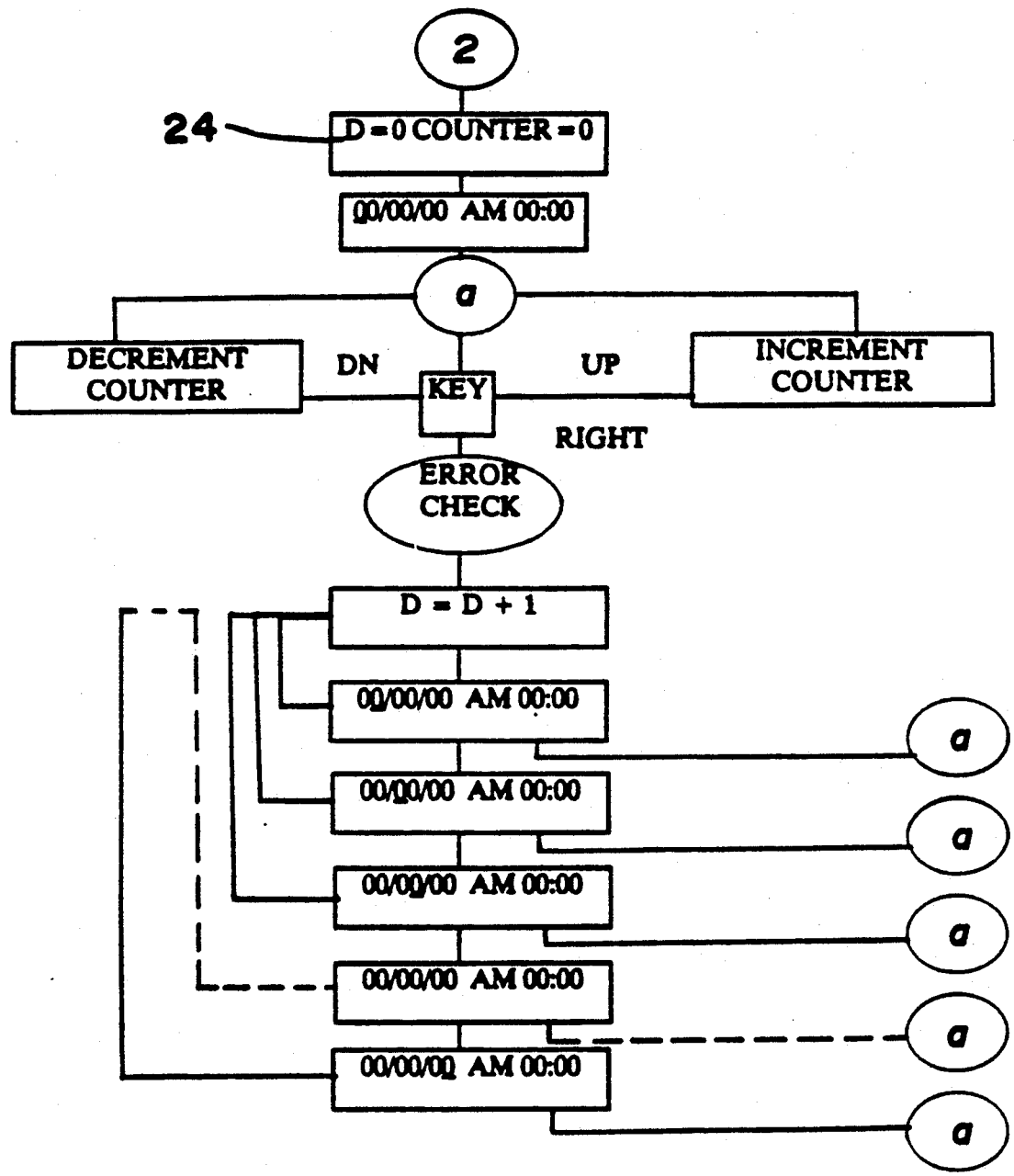
Figure 3C:
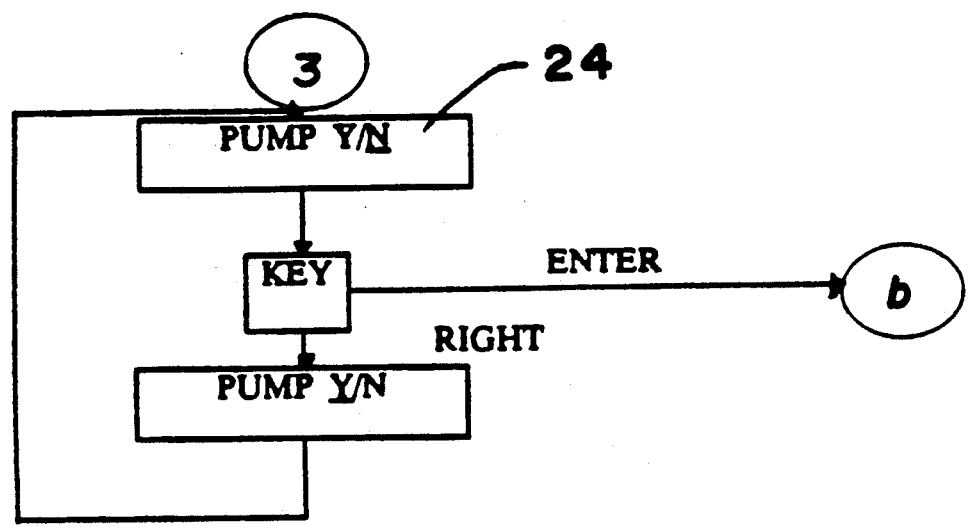
Figure 4A:
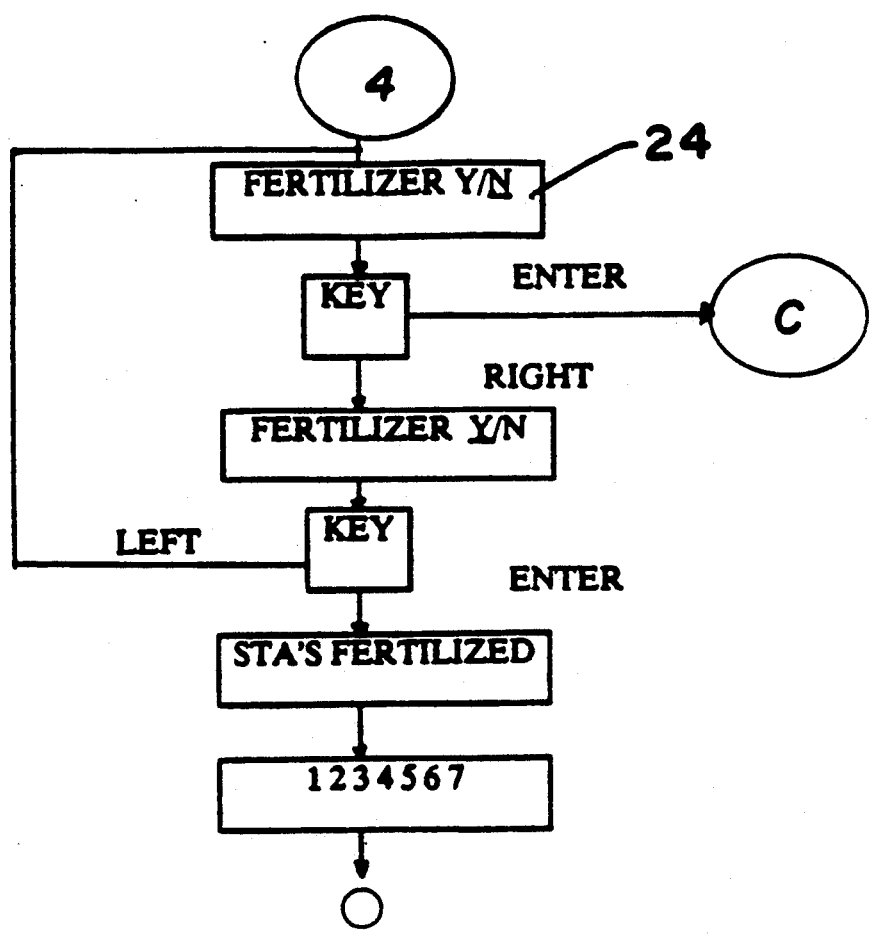
FIG. 4 is a functional flow diagram showing various initialization operations performed to establish fertilization requirements.
Figure 4B:
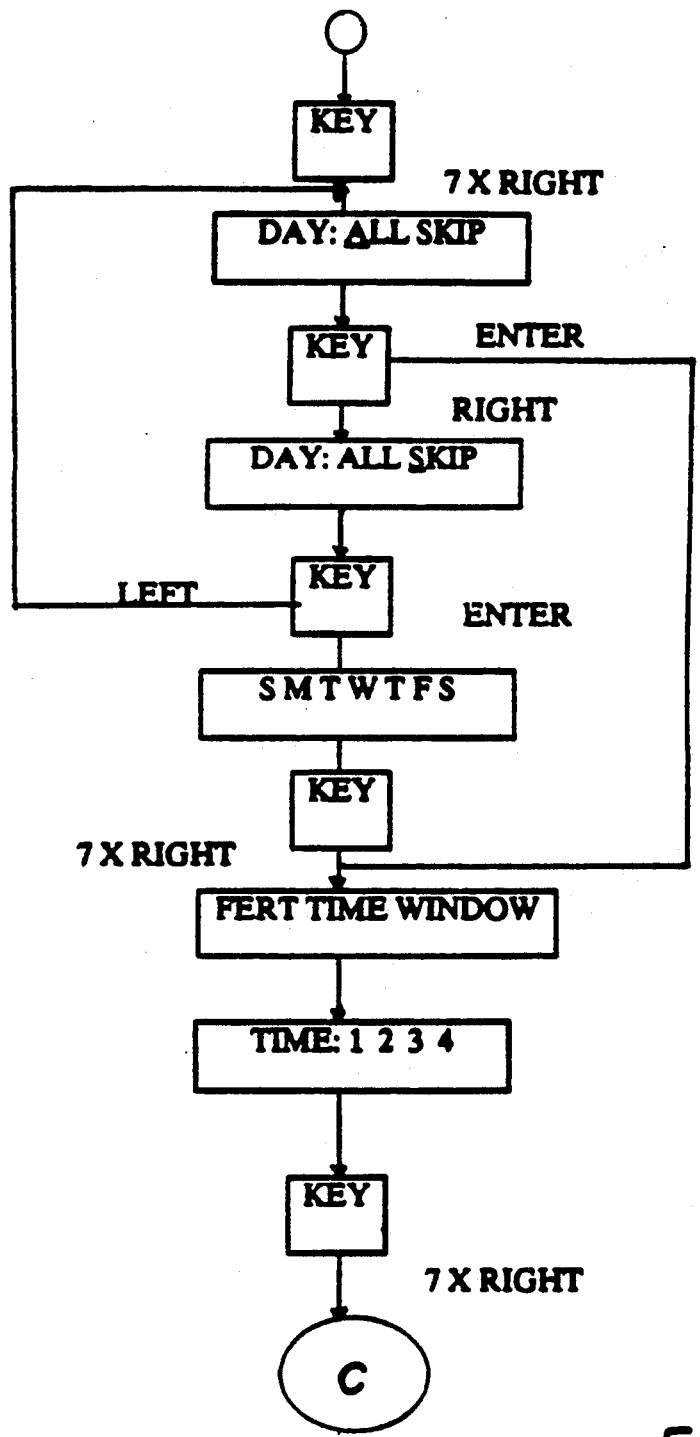
Figure 5A:
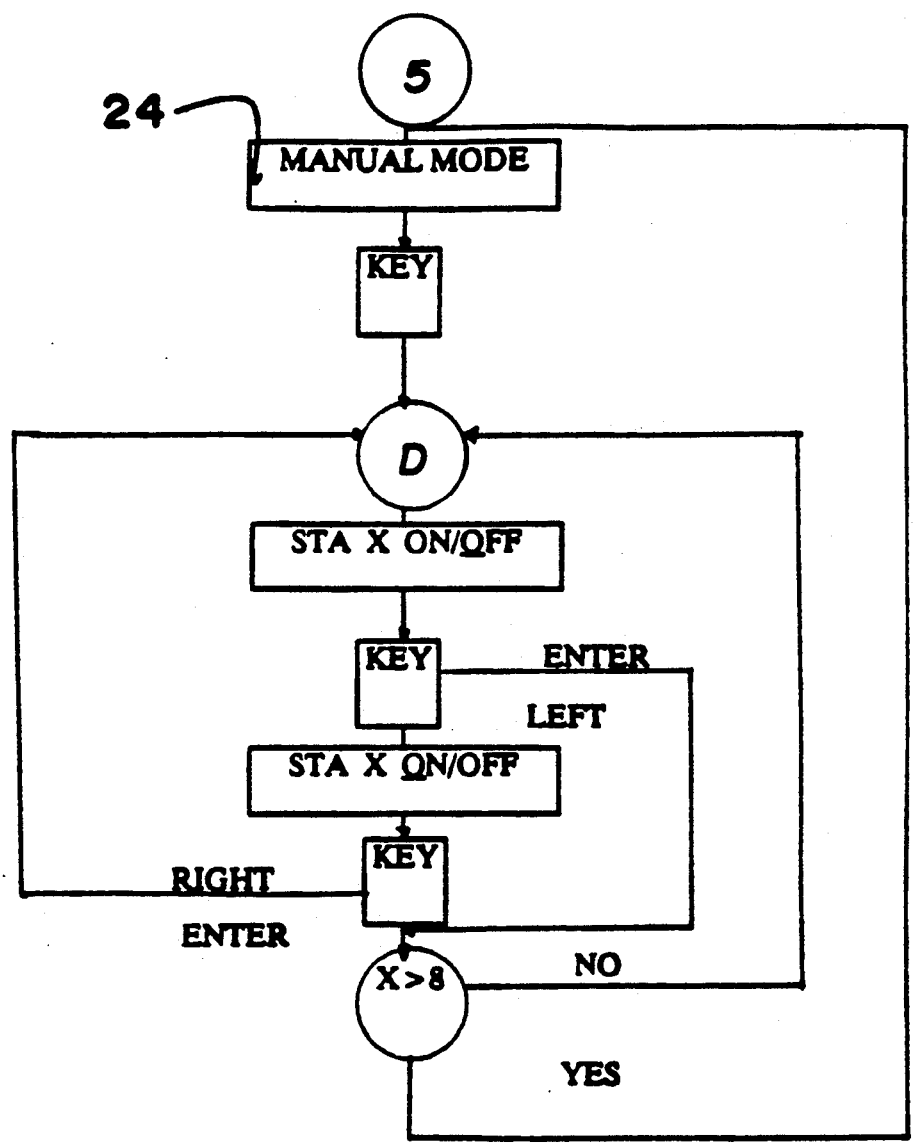
FIG. 5 is a functional flow diagram showing a manual and an automatic mode of operating the computer while practicing the system of the invention.
Figure 5B:
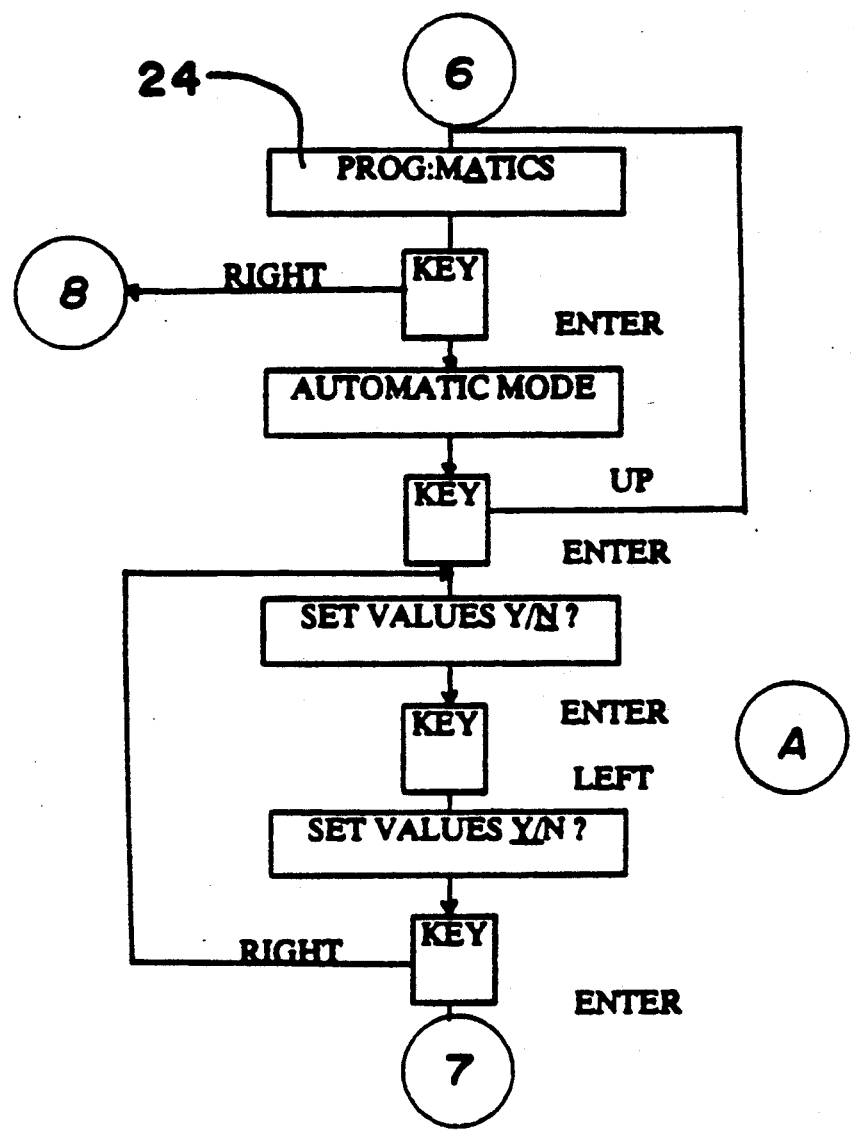

Following the teachings of the computer-controlled irrigation system 10, and as schematically depicted in FIGS. 3–4, included in the set of initialization data 24 established by the operator is a schedule during which the various sprinkler heads 20 are supplied with liquid fertilizer 42 rather than water 40. For example, each or some of the days of the week can be selected or skipped. Also, a fertilizer time window, with its own beginning and ending time, can be established for each sprinkler head 20.

Turning now to FIG. 6, there is shown schematically a blow-out mode. In this mode, any liquid, whether water 40 or liquid fertilizer 42, remaining in the system 10 can be expelled through the sprinkler heads 20 by operation of the injector pump 48 when the main valve 34 is in the second position 38.

In operation, the positions 36, 38 of the main valve 34 can be determined by a control signal from the computer 22. Alternatively, the position of the main valve 34 can be selected manually by an operator.

As noted earlier, each reference sensor 28 is electrically connected by second electrical connections 32 to the computer 22. Included in each reference sensor 28 is a pair of probes 44 which are embedded in the area to be irrigated. In operation, each reference sensor 28 is buried, for example, in the root zone of a plant or a tree. The reference sensor 28 comprises the pair of probes 44 which are so positioned that the soil represents a dielectric therebetween. Inherently, each reference sensor 28 will have a capacitance depending upon its size and dielectric constant of the soil. A source of low frequency alternating current is provided to each reference sensor 28.

Suppose "I" represents the current in amperes through the reference sensor 28 and the potential difference therebetween is expressed as "E" (volts). In practice, only a low alternating current voltage, approximately 5 volts, is used. As is well known, the relation between current, voltage, and resistance in a circuit is expressed in Ohm's Law. As is also well known, current flowing in a circuit is directly proportional to the applied potential difference and adversely proportional to the resistance. Expressed as an equation:

$$I \text{ (amperes)} = \frac{E \text{ (volts)}}{R \text{ (ohms)}}$$

The resistance of the soil is affected by its moisture content, due to the high dielectric constant of water 40. The salinity of the soil also influences its resistance, as does the amount of dissolved minerals that are present in the water 40. A scaling routine is included within the software installed in the computer 22.

In operation, the computer 22 polls each reference sensor 28. Controls signals [S] are received and processed by the computer 22. The feedback is sent to each remote valve 18 based thereupon.

Using the scaling routine, the resistance in ohms measured between the pair of probes 44 is compared with the voltage applied across the pair of probes 44 and converted by a converter (not shown) into a signal which is transmitted by the second electrical connection to the computer 22. The computer 22 controls the remote valves 18 based on the control signal. The remote valves 18 then deliver the irrigating fluid 12 to the area to be irrigated in amounts dependent on the actual moisture level $[M_A]$ as measured by the resistance of soil in the area between the probes 44 and the desired moisture level $[M_D]$ established by the operator.

As shown in the drawings, the software installed in the computer 22 has four programs: (1) automatic; (2) manual; (3) test; and (4) single station. The software includes a manually activated procedure whereby the initialization data 24 are provided to the computer 22 by an operator. By switching to the test mode, the system 10 automatically runs each station for a given interval, three minutes. When switched back to "off," the computer reverts to the preset automatic mode. In the test mode, the computer may also activate an automatic pump start for use in low water pressure environments, or a main valve. The pump start is used where the area to be irrigated is not supplied with a central water pressure system. By switching to the blow-out mode, the control automatically activates each valve for a given interval, for example, three minutes, but will not activate the pump or main valve. In the blow-out mode, all fluid is expelled from the system with air, thus avoiding problems of corrosion after use of a liquid fertilizer 42 or freezing during low temperatures after water 40 is delivered through the system. When switched off, the control again reverts to an automatic mode of operation.

As disclosed, the system functions as an automatic compensating control since it varies the watering time dependent upon ambient conditions such as temperature and wind. Since it is controlled by a computer 22, the unit is menu-driven and gives the operator the full use of computer power which can be harnessed to control selected day settings, for example, odd/even days and multiple on/off times. Also, there is included in the system 10 an ability to change the sequence in which the remote valves 18 are operated. This feature is software-driven and does not require rewiring after installation. It should be noted that under the prior art, conventional timers require rewiring in order to change the sequence in which stations deliver liquid.

In practice, it has been found that the type of computer 22 which serves well in the computer-controlled irrigation system 10 disclosed is a PD78C10 model made by NEC Electronics, Inc. in Mountain View, Calif. This model of computer 22 includes an 8-bit, single chip CMOS micro-computer with an analog-digital converter.

Superior results have been found when a sensor of the type exemplified by the Demaco Model R is used. This type of sensor is available from the Demaco Manufacturing & Design Company located in Dearborn, Mich. The Demaco Model R sensor is designed to function automatically after installation and is corrosion-resistant.

The computer 22 has the capability to control not only remote valves 18 by the first electrical connections, but also such items as driveway lights, flood lights, swimming pool pumps, and fountains which are installed remotely from the computer 22.

Following the teachings of this invention, and with the particular type of computer 22 selected, it has been found that the sum of the number $[N_s]$ of reference sensors 28, the number $[N_v]$ of remote valves 18 connected to the computer 22, and remote installations such as driveway lights and fountains equal a multiple of the number eight (8). For example, if there is only one reference sensor 28, and five remote valves 18, a total of two remote installations of driveway lights, or fountains, can also be controlled by the computer 22 within the system 10.

In summary, there has ben disclosed a computer-controlled irrigation system 10 which responds to a number of problems left unsolved by prior teachings. As disclosed, the system 10 can be installed in conjunction with either new or existing sprinkler systems, and offers significant water savings because it prevents over-watering, and avoids problems associated with underwatering. It has also been found that the system as disclosed limits rotting at the root zone and the associated avoidance of diseases relating to fungus. It has been found that there is minimal wastage of soil nutrients and fertilizer using the system 10 as disclosed, which is suited for commercial, residential, golf course, parks, and recreational usage. As a result, immediate dollar savings are effected after installation.

In operation, the system 10 offers the attributes of convenience associated with automatic moisture control without the need for excessive operator intervention after the initial installation period. Because the system 10 is fully automatic, it avoids the problems presented by prior electro-mechanical operations which are based strictly on a schedule and on a clock timer. Conventional approaches often need to be adjusted for climatic changes, and do not turn themselves off during rainy periods. The present invention avoids these problems by virtue of its fully automated feature.

Cost advantages are also associated with there being a number of reference sensors 28 less than the number of remote valves 18.

While the best mode for carrying out the invention has been described in detail, those familiar with the art to which this invention relates will recognize alternative ways of practicing the invention as defined by the following claims.

What is claimed is:

1. In a computer-controlled irrigation system comprising a reservoir of irrigating fluid, a main supply line, a plurality of lateral supply lines, a plurality of remote valves, and a plurality of sprinkler heads;
   a computer having means for providing the computer with a set of initialization data for the system and for each remote valve, the means for providing the computer with a set of initialization data being supplied by an operator;
   a plurality of reference sensors installed in an area to be irrigated for sensing moisture level therein, the number of reference sensors being less than the number of remote valves;
   means for providing the computer with a set of operational data for each of the plurality of reference sensors, said means for providing the computer with a set of operational data being supplied by the reference sensors, each reference sensor generating a signal indicating actual moisture level for processing by the computer, the computer controlling the plurality of remote valves so that the irrigating fluid is delivered to the sprinkler heads in amounts sufficient to bring the actual moisture level up to a desired moisture level;
   wherein the set of initialization data provided by an operator includes a terrain factor for each of the sprinkler heads, the computer controlling each remote value so that the irrigating fluid is delivered to the associated sprinkler head in amounts dependent on the associated terrain factor.

2. In a computer-controlled irrigation system comprising a reservoir of irrigating fluid, a main supply line, a plurality of lateral supply lines, a plurality of remote valves, and a plurality of sprinkler heads;
   a computer having
      a plurality of first electrical connections, each first electrical connection linking the computer with a remote valve;
      means for providing the computer with a set of initialization data, said initialization data including a terrain factor for each of the sprinkler heads, the computer controlling each remote valve so that the irrigating fluid is delivered to the associated sprinkler head in amounts dependent on the associated terrain factor;
      means for providing the computer with a set of operational data;
   a plurality of reference sensors to be installed in an area to be irrigated, the number of reference sensors being less than the number of remote valves; and
   a plurality of second electrical connections, each second electrical connection linking the computer with one of the reference sensors;
   each reference sensor generating a signal indicating actual moisture level for processing by the computer, the computer controlling the plurality of remote valves so that the irrigating fluid is delivered to the sprinkler head in amounts sufficient to bring the actual moisture level up to a desired moisture level.

3. In a computer-controlled irrigation system comprising a reservoir of irrigating fluid, a main supply line, a plurality of lateral supply lines, a plurality of remote valves, and a plurality of sprinkler heads;
   a computer having
      means for providing the computer with a set of initialization data, said initialization data including a terrain factor for each of the sprinkler heads, the computer controlling each remote valve so that the irrigating fluid is delivered to the associated sprinkler head in amounts dependent on the associated terrain factor;
      means for providing the computer with a set of operational data; and
   a single reference sensor to be installed in the area to be irrigated;
   the reference sensor sending a signal on actual moisture level for processing by the computer, the computer controlling the plurality of remote valves so that the irrigating fluid is delivered to the sprinkler heads in amounts sufficient to bring the actual moisture level up to the desired moisture level.

4. In a computer-controlled irrigation system including a reservoir of irrigating fluid, a main supply line, a plurality of lateral supply lines, each lateral supply line being connected downstream from the main supply line, each lateral supply line delivering the irrigating fluid to the areas to be irrigated, a plurality of remote valves, each remote valve being connected to a lateral supply line, and a plurality of sprinkler heads, each sprinkler head being connected to the associated remote valve;
   a computer having means for providing the computer with a set of initialization and operational data, the initialization data provided by an operator including desired moisture levels in the areas to be irrigated, said set of initialization data including a terrain factor for each of the sprinkler heads, the computer controlling each remote valve so that the irrigating fluid is delivered to the associated sprinkler head in amounts dependent on the associated terrain factor; and
   a reference sensor installed in the area to be irrigated, the reference sensor measuring actual moisture levels in the areas to be irrigated and generating signals on actual moisture levels for processing by the computer, the computer controlling the plurality of remote valves based on signals from the reference sensor and the desired moisture levels so that the irrigating fluid is delivered to the sprinkler heads in amounts sufficient to bring the actual moisture level up to the desired moisture level.

5. The computer-controlled irrigation system of claims 1, 2, 3, or 4, further including:

a main valve connected to the reservoir of irrigating fluid and to the main supply line, the main valve being selectively positionable between a first position and a second position; and the reservoir of irrigating fluid comprises separated bodies of water and liquid fertilizer, so that when the first position is selected, water is delivered to the areas to be irrigated, and when the second position is selected, liquid fertilizer is delivered to the areas to be irrigated.

6. The computer-controlled irrigation system of claims 1, 2, 3, or 4, further including:

a main valve connected to the reservoir of irrigating fluid and to the main supply line, the main valve being selectively positionable by a control signal from the computer between a first position and a second position; and the reservoir of irrigating fluid comprises separated bodies of water and a liquid fertilizer, so that when the first position is selected, water is delivered to the areas to be irrigated, and when the second position is selected, liquid fertilizer is delivered to the areas to be irrigated.

7. The computer-controlled irrigation system of claim 1, 2, 3, or 4, wherein the set of initialization data provided by an operator includes an interval variation factor for each of the sprinkler heads, the computer controlling each remote valve so that the irrigating fluid is delivered to the associated sprinkler head in amounts dependent on the associated interval variation factor.

8. The computer-controlled irrigation system of claim 1, 2, 3, or 4, wherein the set of initialization data provided by an operator includes a begin time and a end time for each day of the week associated with each of the remote valves, the computer controlling each remote valve so that the irrigating fluid is delivered to the associated sprinkler head in amounts dependent on the associated begin and end times and the day of the week.

9. The computer-controlled irrigation system of claim 1, 2, 3, or 4, wherein the set of initialization data provided by an operator includes a terrain factor, an interval variation factor, a begin time and a end time for each day of the week associated with each of the remote valves, the computer controlling each remote valve so that the irrigating fluid is delivered to the associated sprinkler head in amounts dependent on the associated terrain factor, interval variation factor, the begin time, the end time and the day of the week.

10. In a computer-controlled method of irrigating an area having embedded therein a plurality of remote sprinkler heads, an improvement comprising the steps of:

storing desired moisture level data in the computer for a plurality of stations in the area to be irrigated;

measuring the actual moisture level by a signal reference sensor installed proximate the area to be irrigated;

determining a time interval for irrigation, the time interval being required to irrigate so that the actual moisture level proximate the reference sensor equals the desired moisture level proximate the reference sensor;

irrigating through successive sprinkler heads for a time at each successive sprinkler head equal to the time interval for irrigation proximate the reference sensor, thereby controlling the delivery of irrigating fluid to the area to be irrigated based on desired and actual moisture levels so that the irrigating fluid is delivered in amounts sufficient to bring the actual moisture level up to the desired moisture level.

11. The method of claim 10, further including the step of:

storing in the computer a set of initialization data for each of the remote sprinkler heads, the set of initialization data including a terrain factor, a time interval variation factor, a begin time, and an end time; and irrigating proximate each sprinkler head for a period of time equal to the time interval for irrigation proximate the reference sensor, adjusted by an amount corresponding to the set of initialization data for the associated sprinkler head.

* * * * *